(No Model.)

M. CHASE.
CUSHION FOR THE TIRES, &c., OF VEHICLE WHEELS.

No. 324,534. Patented Aug. 18, 1885.

UNITED STATES PATENT OFFICE.

MILTON CHASE, OF HAVERHILL, MASSACHUSETTS.

CUSHION FOR THE TIRES, &c., OF VEHICLE-WHEELS.

SPECIFICATION forming part of Letters Patent No. 324,534, dated August 18, 1885.

Application filed April 4, 1885. (No model.)

*To all whom it may concern:*

Be it known that I, MILTON CHASE, a citizen of the United States, residing at Haverhill, in the county of Essex and State of Massachusetts, have invented a new and useful Improvement in Cushions for the Tires and Fellies of Vehicle-Wheels, of which the following is a specification.

The object of my invention is to produce a waterproof elastic packing suitable for a cushion between the tire and fellies of wheels of vehicles whereby the tire or the wood-work of the wheel may expand or contract without injury to the same.

The invention consists of a thickness of cork, either granulated or in strips, secured between two strips of cloth, or between a strip of cloth and a strip of asbestus or fire-proof paper, or between two strips of asbestus or fire-proof paper, according as the tire is to be put on hot or cold.

Figure 1:
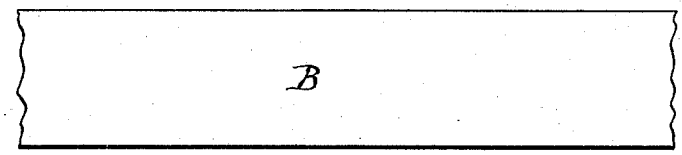
Figure 2:
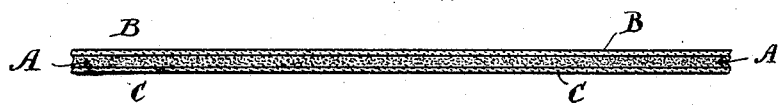
Figure 3:
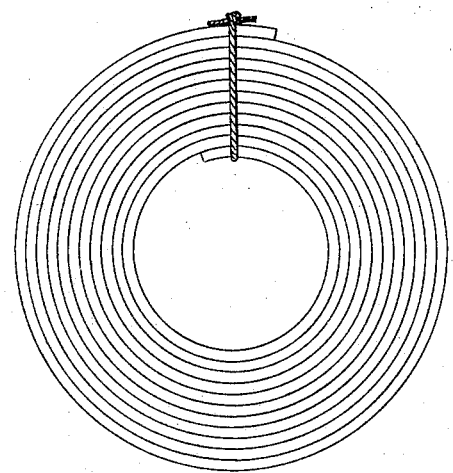

Referring to the accompanying drawings, Figure 1 represents a portion of a strip of waterproof elastic packing made according to my invention. Fig. 2 is a longitudinal section of the same. Fig. 3 represents a strip of my waterproof elastic packing coiled up ready for the market.

A represents a thickness of cork and elastic water-proof cement. B and C are layers of cloth, asbestus, or fire-proof paper.

In making packing according to my invention from granulated cork I first spread some suitable water-proof elastic cement upon a strip of cloth, asbestus, or water-proof paper and then sift a layer of granulated cork upon the same and let it set. I then brush off the loose cork and apply another layer of cement and another layer of granulated cork, and so on until the desired thickness has been obtained, when the other strip of cloth, asbestus, or fire-proof paper is applied, and the whole strip is then passed between rollers under pressure, so as to compress the strip even and to the required thickness.

When the packing is made from strips of cork, the cork may be cut into strips of the entire length of the strip of packing to be made, and of such thickness that several layers or only one layer will be required; or, if the strips of cork are short, they must be so placed that the joints in one layer do not come opposite the joints in the other layers.

The water-proof elastic packing is made into strips of various lengths and widths to suit the various-sized wheels of vehicles in ordinary use, and is then coiled up and secured, as shown in Fig. 3, and, marked with its length and width, it is then ready for sale.

When the packing is required for a tire that is to be set cold, then the strip with cloth on both sides is preferably used, but when the tire is to be put on hot a strip with asbestus or fire-proof paper on one or both sides must be employed.

What I claim as my invention is—

1. A water-proof elastic packing consisting of a combination of cork and a water-proof elastic cement between two pieces of cloth or other suitable material, substantially as shown and described.

2. As a new article of manufacture, a strip of water-proof elastic packing suitable for a cushion between the tires and fellies of vehicle-wheels, consisting of a combination of cork and a water-proof elastic cement between two strips of cloth or other suitable material, and formed into a coil ready for application, substantially as shown and described.

3. A covering of asbestus or other fire-proof material, in combination with the portion of the packing which is subjected to the heated tire, as set forth.

In testimony whereof I have signed my name to this specification in the presence of two subscribing witnesses.

MILTON CHASE.

Witnesses:
JOS. H. ADAMS,
E. PLANTA.